(12) United States Patent
Eigner et al.

(10) Patent No.: US 7,159,675 B2
(45) Date of Patent: Jan. 9, 2007

(54) METHOD OF DRILLING A BOREHOLE INTO AN EARTH FORMATION

(75) Inventors: Manfred Rudolf Paul Eigner, Rijswijk (NL); Beatrice Neustadt, Houston, TX (US); Jeanette Caroline Schouten, Rijswijk (NL)

(73) Assignee: Shell Oil Company, Houston, TX (US)

( * ) Notice: Subject to any disclaimer, the term of this patent is extended or adjusted under 35 U.S.C. 154(b) by 240 days.

(21) Appl. No.: 10/495,847

(22) PCT Filed: Nov. 18, 2002

(86) PCT No.: PCT/EP02/12894

§ 371 (c)(1),
(2), (4) Date: May 17, 2004

(87) PCT Pub. No.: WO03/044317

PCT Pub. Date: May 30, 2003

(65) Prior Publication Data
US 2005/0016772 A1    Jan. 27, 2005

Related U.S. Application Data

(60) Provisional application No. 60/333,099, filed on Nov. 19, 2001.

(51) Int. Cl.
*E21B 7/00* (2006.01)
*E21B 37/00* (2006.01)

(52) U.S. Cl. .......................... 175/65; 175/57
(58) Field of Classification Search ............... None
See application file for complete search history.

(56) References Cited

U.S. PATENT DOCUMENTS

| 2,276,075 | A |   | 3/1942  | Wuensch ............... 252/8.5 |
| 3,887,474 | A | * | 6/1975  | Senfe et al. ............ 507/140 |
| 4,222,444 | A |   | 9/1980  | Hamilton ............... 175/72 |
| 4,269,279 | A |   | 5/1981  | House .................. 175/66 |
| 5,260,266 | A |   | 11/1993 | Forsberg et al. ........ 507/133 |
| 5,676,213 | A |   | 10/1997 | Auzerais et al. ........ 175/58 |
| 5,944,986 | A |   | 8/1999  | Saho et al. ............ 210/173 |

OTHER PUBLICATIONS

International Search Report dated Apr. 3, 2003.

\* cited by examiner

*Primary Examiner*—Zakiya W. Bates

(57) ABSTRACT

A method of drilling a borehole in an earth formation wherein a plurality of selected solid magnetisable particles is inserted into the borehole, the particles being susceptible of forming a filter cake layer at the borehole wall and being made of a material susceptible of being exposed to magnetic forces when subjected to a magnetic field. A section of the borehole is drilled, and at least part of the filter-cake layer is removed from the wall of the drilled borehole section by inducing a selected magnetic field in the borehole. The magnetic field exerts magnetic forces to the particles, thereby withdrawing the particles from the wall.

19 Claims, 1 Drawing Sheet

METHOD OF DRILLING A BOREHOLE INTO AN EARTH FORMATION

CROSS REFERENCE TO RELATED APPLICATION

The present application is a U.S. national stage application under USC § 371 of PCT/EP02/12894 filed 18 Nov. 2002, which claims priority of U.S. provisional application 60/333,099 filed 19 Nov. 2001.

FIELD OF INVENTION

The present invention relates to a method of drilling a borehole in an earth formation, the borehole containing a body of drilling fluid.

BACKGROUND OF THE INVENTION

During drilling of wellbores it is common practice to form a filter-cake layer at the borehole wall to limit outflow of drilling fluid into the earth formation surrounding die wellbore. Included solid particles in the drilling fluid which block the pores of the earth formation at the borehole wall, conventionally forms the filter-cake layer. A polymer is furthermore included in the drilling fluid for the purpose of binding the particles to each other. The filter-cake is created by limited leak-off of drilling fluid into the earth formation. When production of hydrocarbon fluid is to be started, it is necessary either to remove or bypass the filter-cake layer. It has been tried to remove the filter-cake layer by producing hydrocarbon fluid from the earth formation into the wellbore ("back flowing"), or by dissolving the layer using acid. Back flowing is normally inefficient because the flow rate is generally too low to remove the filter-cake layer, especially for long horizontal wellbore sections. Acidizing also is generally inefficient because once the acid has dissolved a portion of the filter-cake layer, the remaining acid tends to enter the formation at the location of the removed portion.

SUMMARY OF THE INVENTION

In accordance with the invention there is provided a method of drilling a borehole in an earth formation, the borehole containing a body of drilling fluid, the method comprising the steps of:
a) inserting a plurality of selected solid magnetisable particles into the borehole, the particles being susceptible of forming a filter cake layer at the borehole wall and being made of a material susceptible of being exposed to magnetic forces when subjected to a magnetic field;
b) drilling a section of the borehole; and
c) removing at least part of the filter-cake layer from the wall of said drilled borehole section by inducing a selected magnetic field in the borehole, said magnetic field exerting magnetic forces to the particles so as to withdraw the particles from the borehole wall.

Suitably step c) comprises inserting a magnetic field source in the borehole and moving the magnetic field source through the borehole.

In a preferred embodiment the magnetic field source includes at least one of a permanent magnet and an electromagnet. In case of a permanent magnet, it is preferred that the magnet is enclosed in a removable case of a suitable material which prevents, or suppresses, the magnetic field induced by the magnet outside the case. Remote control means can be used to remove the case from the magnet.

Suitably step a) comprises inserting a magnetic rheological fluid (MRF) into the borehole. Such fluid contains suspended magnetisable particles (e.g. iron particles 1–100 µm) which allow the rheological behaviour of the fluid to be controlled through the application of a magnetic field. Before application of the magnetic field, the particles are randomly arranged. After application of such field the particles become aligned in the direction of the field thereby creating an attractive force between the particles resulting in a kind of network.

BRIEF DESCRIPTION OF THE DRAWINGS

The invention will be further described in more detail and by way of example with reference to the accompanying drawings in which.

DETAIL DESCRIPTION OF THE INVENTION

Figure 1:
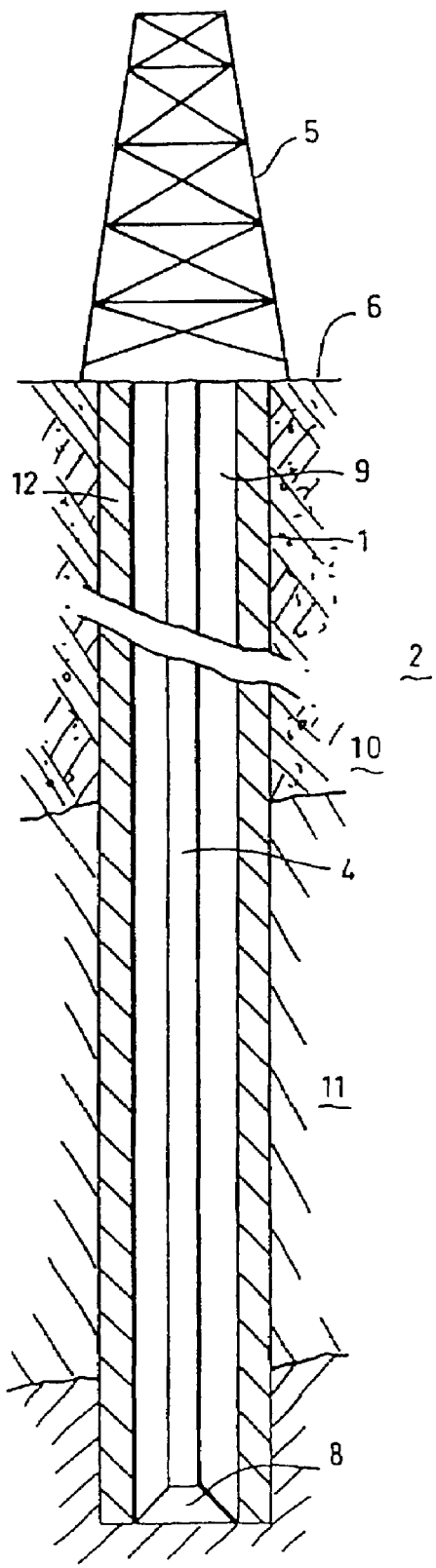
FIG. 1 schematically shows a borehole formed in an earth formation, during drilling of the borehole using the method according to the invention.

Referring to FIG. 1 there is shown a borehole 1 drilled into an earth formation 2 using a drill string 4 extending from a drilling rig 5 located at surface 6, the drill string being provided with a drill bit 8 at the lower end thereof. The borehole is filled with a body of drilling fluid 9. The earth formation 2 includes an overburden zone 10 and a hydrocarbon fluid bearing zone 11, the borehole 1 passing through both zones 10, 11. A filter-cake layer 12 is present at the wall of the borehole, which filter-cake layer 12 serves to limit outflow of drilling fluid into the earth formation. The filter-cake layer 12 includes solid magnetisable particles (not shown) and a binding agent for binding the particles to each other, which solid particles substantially block the pores of the formation at the borehole wall. The solid particles of the filter-cake layer 12 in the borehole section traversing the overburden zone 10 are conventional particles for forming a filter-cake layer, whereas the solid particles of the filter-cake layer 12 in the borehole section traversing the hydrocarbon fluid bearing zone 11 are made of a ferromagnetic material and thereby are susceptible of being exposed to magnetic forces when subjected to a magnetic field.

Figure 2:
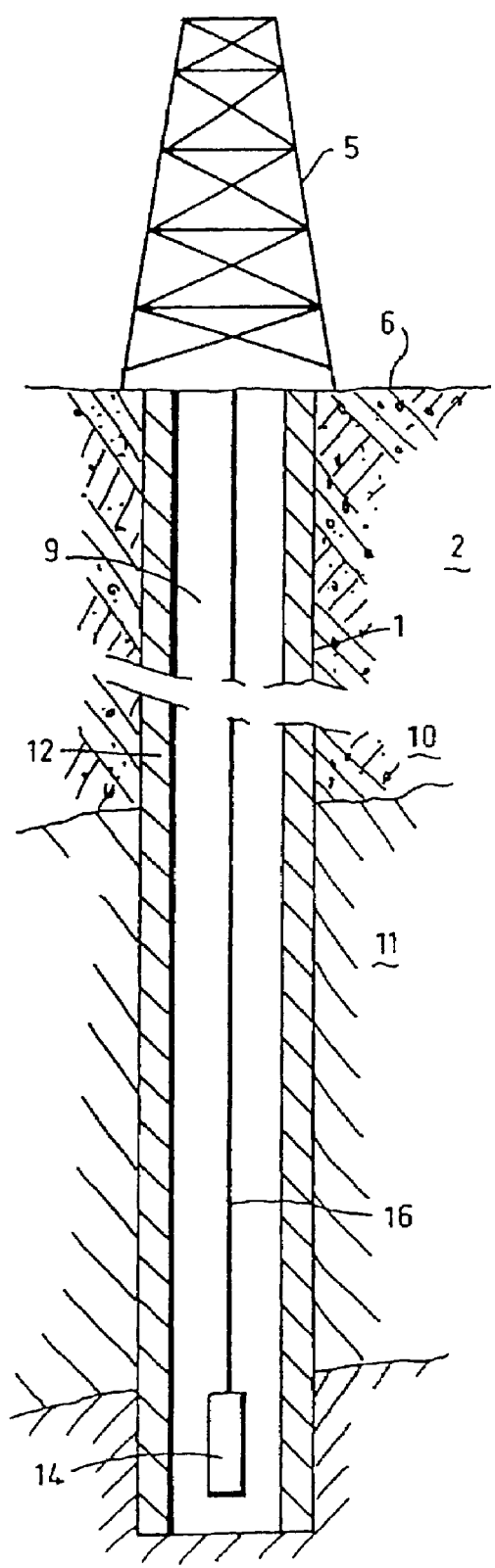
FIG. 2 schematically shows the borehole of FIG. 1, during removal of the filter-cake layer from the wall using the method according to the invention.

Referring further to FIG. 2 there is shown the borehole of FIG. 1 whereby the drill string has been removed from the borehole 1, and whereby a magnet 14 is suspended in the borehole by a wireline 16. The magnet 14 is enclosed in a case (not shown) of non-magnetisable material (e.g. stainless steel). The case is removable from the magnet 14 by remote control from surface.

During normal use the borehole 1 is deepened by rotating the drill string 4 and by circulating drilling fluid through the borehole. The drilling fluid contains a plurality of selected solid magnetisable particles and a binding agent for forming the filter-cake layer 12, which is formed by limited leak-off of drilling fluid into the earth formation 2. Instead of using magnetisable particles during drilling of the borehole section traversing the overburden zone 10, conventional solid particles can be used in the drilling fluid. During drilling of the borehole section traversing the hydrocarbon fluid bearing zone 11 the magnetisable particles of ferromagnetic material are used in the drilling fluid.

After finalising drilling of the borehole 1, the drill string 4 is removed from the borehole 1, and the magnet 14 is lowered into the borehole 1 by wireline 16 until the magnet 14 is located at or near the bottom of the borehole 1. The magnet 14 is then activated by removing the case from the magnet by remote control so as to induce a magnetic field of selected strength in the borehole 1. The magnet 14 is then slowly pulled in upward direction through the borehole section traversing the hydrocarbon fluid bearing zone 11. The magnetic field induces magnetic forces to the solid particles of ferromagnetic material, which forces withdraw the solid particles of ferromagnetic material from the borehole wall and thereby remove the filter-cake layer 12 present in the borehole section traversing the hydrocarbon fluid bearing zone 11, from the borehole wall. To promote removal of the filter-cake layer from the borehole wall, simultaneously with activating the magnet 14 the fluid pressure in the body of drilling fluid is lowered so as to allow inflow of hydrocarbon fluid from the reservoir zone 11 into the borehole 1.

The solid particles of ferromagnetic material can be left in the borehole 1 after their removal from the borehole wall, or they can be circulated to surface and removed from the borehole 1 by circulating a drilling fluid through the borehole 1 using a suitable conduit, for example the drill string 4, extending into the borehole 1.

Instead of lowering the magnet by wire line into the borehole, the magnet can be lowered into the borehole on coiled tubing, which is tubing of a small diameter, wound onto a reel located at surface. The coiled tubing can then further be used to immediately circulate the particles to surface during and after removal of the particles from the borehole wall.

Instead of using a permanent magnet, an electromagnet can be applied which is connected to an electric power supply at surface via a conductor incorporated in the wireline.

While the illustrative embodiments of the invention have been described with particularity, it will be understood that various other modifications will be readily apparent to, and can be easily made by one skilled in the art without departing from the spirit of the invention. Accordingly, it is not intended that the scope of the following claims be limited to the examples and descriptions set forth herein but rather that the claims be construed as encompassing all features which would be treated as equivalents thereof by those skilled in the art to which this invention pertains.

We claim:

1. A method of drilling a borehole in an earth formation, the borehole containing a body of drilling fluid, the method comprising the steps of:
   a) inserting a plurality of selected solid magnetisable particles into the borehole, the particles being susceptible of forming a filter cake layer at the borehole wall and being made of a material susceptible of being exposed to magnetic forces when subjected to a magnetic field;
   b) drilling a section of the borehole; and
   c) removing at least part of the filter-cake layer from the wall of said drilled borehole section by inducing a selected magnetic field in the borehole, said magnetic field exerting magnetic forces to the particles withdrawing the particles from said wall.

2. The method of claim 1, wherein the drilling fluid includes a compound for binding the particles so as to form the filter-cake layer.

3. The method of claim 2, wherein step a) comprises inserting the particles into the body of drilling fluid and circulating the drilling fluid through the borehole.

4. The method of claim 2, wherein said section of the borehole passes through an earth formation zone containing an earth formation fluid.

5. The method of claim 2, wherein step c) comprises inserting a magnetic field source in the borehole and moving the magnetic field source through the borehole.

6. The method of claim 1, wherein step a) comprises inserting the particles into the body of drilling fluid and circulating the drilling fluid through the borehole.

7. The method of claim 6, wherein said section of the borehole passes through an earth formation zone containing an earth formation fluid.

8. The method of claim 6, wherein step c) comprises inserting a magnetic field source in the borehole and moving the magnetic field source through the borehole.

9. The method of claim 1, wherein said section of the borehole passes through an earth formation zone containing an earth formation fluid.

10. The method of claim 9, further comprising simultaneously with step c) inducing said earth formation fluid to flow into the borehole.

11. The method of claim 10, wherein step c) comprises inserting a magnetic field source in the borehole and moving the magnetic field source through the borehole.

12. The method of claim 9, wherein step c) comprises inserting a magnetic field source in the borehole and moving the magnetic field source through the borehole.

13. The method of claim 1, wherein step c) comprises inserting a magnetic field source in the borehole and moving the magnetic field source through the borehole.

14. The method of claim 13, wherein the magnetic field source includes at least one of a permanent magnet and an electromagnet.

15. The method of claim 1, further comprising after step c), allowing the particles to deposit on the bottom of the borehole.

16. The method of claim 1, further comprising after step c) circulating the drilling fluid containing said particles through the borehole to surface.

17. The method of claim 16, wherein step c) comprises inserting a magnetic field source in the borehole and moving the magnetic field source through the borehole, wherein the magnetic field source is suspended in the borehole on coiled tubing, and wherein the drilling fluid is pumped into the borehole through the coiled tubing.

18. The method of claim 1, wherein said particles are made of a ferromagnetic material.

19. The method of claims 1, wherein step a) comprises inserting a magnetic rheological fluid (MRF) into the borehole.

* * * * *

UNITED STATES PATENT AND TRADEMARK OFFICE
CERTIFICATE OF CORRECTION

| | | |
|---|---|---|
| PATENT NO. | : 7,159,675 B2 | Page 1 of 1 |
| APPLICATION NO. | : 10/495847 | |
| DATED | : January 9, 2007 | |
| INVENTOR(S) | : Frigo et al. | |

It is certified that error appears in the above-identified patent and that said Letters Patent is hereby corrected as shown below:

Title page, in item (12), delete "Eigner et al." and insert --Frigo et al.--.

Title page, item (75), insert --Dario M. Frigo, Houston, TX (US)--, as first inventor Signed and Sealed this Twenty-second Day of May, 2007

JON W. DUDAS
*Director of the United States Patent and Trademark Office*